US006332443B1

United States Patent
Kaita

(10) Patent No.: US 6,332,443 B1
(45) Date of Patent: Dec. 25, 2001

(54) LUBRICATING OIL SUPPLYING STRUCTURE FOR CRANKSHAFT

(75) Inventor: Keiji Kaita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/649,514

(22) Filed: Aug. 29, 2000

(30) Foreign Application Priority Data

Aug. 29, 2000 (JP) .................................................. 12-258786

(51) Int. Cl.[7] ........................................................ F01M 1/06
(52) U.S. Cl. ............................................................ 123/196 R
(58) Field of Search ............................................ 123/196 R

(56) References Cited

U.S. PATENT DOCUMENTS

| 4,589,382 | * | 5/1986 | Tsuboi | 123/196 R |
| 5,092,292 | * | 3/1992 | Iguchi et al. | 123/196 R |
| 5,617,822 | * | 4/1997 | Masuda | 123/196 R |
| 5,860,404 | * | 1/1999 | Tanaka | 123/196 R |
| 6,032,635 | * | 3/2000 | Moorman et al. | 123/196 R |

* cited by examiner

Primary Examiner—Marguerite McMahon
(74) Attorney, Agent, or Firm—Oliff & Berridge PLC

(57) ABSTRACT

More lubricating oil can be supplied to a connecting rod bearing provided in a connecting rod to provide excellent lubrication between the connecting rod and a crank pin. A pair of oil groove portions 13a and 13b is provided in an inner circumferential surface portion 17 of a crank journal bearing 11, which extends in the movement direction of a piston 32 and which is disposed opposite to each other. A lubricating oil supplying passage 28 is provided between the crank journal 10 and the crank pin 20, one end portion 29 of which is opened to the groove portions 13a and 13b provided in the crank journal bearing 11, the other end portion 30 of which is opened to an inner circumferential surface portion 23 of the connecting rod bearing 22, and which supplies the lubricating oil to the connecting rod bearing 22.

10 Claims, 7 Drawing Sheets

LUBRICATING OIL SUPPLYING STRUCTURE FOR CRANKSHAFT

BACKGROUND OF THE INVENTION

1. Field of the Invention

The present invention relates to a lubricating oil supplying structure for a crankshaft, and in particular to a lubricating oil supplying structure for a crankshaft, which is provided to a connecting rod and which can smoothly supply a lubricating oil to a connecting rod bearing contacting a crank pin.

2. Description of the Related Art

In general, as shown in FIGS. 6 and 7, a crankshaft 51 of, for instance, a straight four cylinder engine 50 is supported and fixed within a crank case 53 by a crank journal support structure 55. The crank journal support structure 55 is constructed such that a plurality of crank journal bearings 67 of semi-circular shape in a aide view are provided at lower end portions of plural crank journal supporting wall portions 66 within the crank case 53 of a cylinder block 52, and the crank journal bearing 67 are coupled respectively to bearing caps 56 of semi-circular shape in a cross view.

On the other hand, as shown in FIGS. 7 and 8, a piston 59 is axially supported through a piston pin 68 by a small end side 58 of the connecting rod 57, and a big end side 60 of the connecting rod 57 is axially supported through a connecting rod bearing 62 by a crank pin 61 of the crankshaft 51.

The crankshaft 51 is provided with a lubricating oil supplying passage inside thereof unillustrated, and a lubricating oil pressured by an oil pump is supplied to a crank journal bearing 67 contacting the crank journal 54 and the connecting rod bearing 62 supporting the connecting rod 57 to the crank pin 61, thereby lubricating the crank journal 54 and the crank journal bearing 67, as well as the crank pin 61 and the connecting rod bearing 62.

That is, the crank journal bearing 67 is provided with an oil groove (not shown), to which the lubricating oil pressured by the oil pump is supplied. The lubricating oil spread out from the oil groove lubricates between the crank journal 54 and the crank journal bearing 67. The lubricating oil supplying passage is provided between the crank journal 54 and the crank pin 61, one end of which is opened to an oil groove of the crank journal bearing 55, and the other end of which is opened at a surface portion of the crank pin 61 to a slidingly contacting surface 63 of the connecting rod bearing 62 with the crank pin 61 to which the connecting rod 57 is mounted.

Therefore, the lubricating oil entering the oil groove provided in the crank journal bearing 67 by the action of the oil pump lubricates the inner circumferential surface 65 of the crank journal bearing 67. The lubricating oil also reaches the crank pin 61 through the lubricating oil passage from the oil groove, and spread to the slidingly contacting surface 63 of the connecting rod bearing 62 to lubricate the slidingly contacting surface 63 of the connecting rod bearing 62 with the crank pin 61.

Besides, a combustion load within the cylinder acts the most largest in a cylinder axial direction to the crank journal bearing 67 through the piston 59 and the connecting rod 57. That is, the generated combustion load acts the most largely to the bearing cap 56 located at the lower and portion of the bearing as shown in FIG. 6.

In this case, for example, if the oil groove is provided in the bearing inner circumferential surface 65 at the bearing cap 56, the pressure receiving surface of the bearing inner circumferential surface 65 where the combustion load acts is reduced by the provision of the oil groove. Consequently, the combustion load against which the crank journal bearing 67 can bear is made small, requiring an upper limitation to the generated combustion load.

Therefore, in designing an engine, in general, a required engine power is first determined, and then a combustion pressure necessary for the engine power and an engine revolution speed are calculated, and a bearing width necessary for the combustion pressure is determined. In this case, as mentioned above, if it is necessary to inevitably provide an oil groove in a portion receiving the combustion load, the bearing width dimension in that portion must be made large. Consequently, the bearing width is increased, and the engine weight is enlarged correspondingly. This is disadvantageous in designing the engine, for inviting the increases of the bearing width and the engine weight.

For this reason, conventionally, an oil groove is normally provided in the crank journal bearing 67 not over the entire circumference of the bearings and which is located at a portion where the generated combustion load does not act directly. For example, in the case where a cylinder arrangement of an engine is straight or V-type, the oil groove is typically provided partially in the crank journal bearing 67 of the crank case to avoid such an instance that it is provided in the crank journal bearing 67 of the bearing cap 56.

When the oil groove is provided in the entire circumference of the crank journal bearing 67, the lubricating oil supplying passage is constantly opened to the oil groove regardless of the rotational angle of the crank journal 54, and accordingly the lubricating oil supplied by the oil pump can constantly supplied to the slidingly contacting surface 63 of the connecting rod bearing 62 with the crank pin 61. However, when the oil groove is provided partially in the crank journal bearing 67, an end portion of the lubricating oil supplying passage is not always opened to the oil groove depending on a certain rotational angle.

In this case, since the connecting rod 57 is a member for transmitting the vertical movement of the piston 59 to the crank journal 54 through the crank pin 61, and if consideration is given to the magnitude of the combustion load acting on the coupled portion between the big and 60 and the crank pin 61, it is desirable to constantly supply the lubricating oil in-between the connecting rod bearing 62 and the crank pin 61 for lubrication.

SUMMARY OF THE INVENTION

Accordingly, aspects of the present invention is to provide a lubricating oil supplying structure for a crankshaft, which can supply lubricating oil to a connecting rod bearing provided in a connecting rod so as to perform excellent lubrication between the connecting rod and a crank pin, and which can support a predetermined combustion load of an engine.

Accordingly, the other aspect of the present invention is, in addition to the object of the first aspect, to provide a lubricating oil supplying structure for a crankshaft, which can supply more lubricating oil to a connecting rod bearing provided in a connecting rod to perform excellent lubrication between the connecting rod and the crank pin.

An object of the other aspect of the present invention is, in addition to the object of the second aspect, to provide a lubricating oil supplying structure for a crankshaft, in which a complicated lubricating oil supplying passage is not required within a crankshaft.

The other aspect of the present invention is, in addition to the object of the third aspect, to provide a lubricating oil supplying structure for a crankshaft, which can continuously supply lubricating oil from an oil groove portion of a crank journal bearing to a connecting rod bearing.

The other aspect of the present invention is, in addition to the object of the second aspect, to provide a lubricating oil supplying structure for a crankshaft, which can maintain a pressure-resistive load acting on a connecting rod bearing at a predetermined magnitude.

The other aspect of the present invention is, in addition to the object of the first aspect, to provide a lubricating oil supplying structure for a crankshaft, which can smoothly supply lubricating oil to a portion where the largest combustion load acts in a connecting rod.

According to the first aspect of the present invention, a lubricating oil supplying structure for a crankshaft 19, which is provided within the crankshaft 19 disposed within a cylinder block of an engine and which supplies lubricating oil from a crank journal bearing 11 supporting a crank journal 10 to a connecting rod bearing 22 provided in a connecting rod 21 coming into contact with in a crank pin 20, the lubricating oil supplying structure characterized in that a pair of oil groove portions 13a and 13b is provided in an inner circumferential surface portion 17 of the crank journal bearing 11 to extend across a connecting surface 44 of a construction member supporting the crank journal and formed along a moving direction of a piston 32 and opposed to each other, and a lubricating oil supplying passage 28 for supplying the lubricating oil to the connecting rod bearing 22 is provided between the crank journal 10 and the crank pin 20, one end portion 29 of which is opened to the oil groove portions 13a and 13b provided in the crank journal bearing 11, the other end portion 30 of which is opened to an inner circumferential surface portion 23 of the connecting rod bearing 22.

Here, "a construction member supporting the crank journal" represents, for example, in an engine in which the cylinder arrangement is straight or V-type, a crank journal supporting structure 55 including a crank journal supporting wall portion 66 of a crank case 53 and a bearing cap 56. "A connecting surface of a construction member supporting the crank journal" represents, for example, a connecting surface between the crank journal supporting wall portion 66 of the crank case 53 and the bearing cap 56.

In the case of an engine in which the cylinder arrangement is the horizontally opposing type, "a construction member supporting the crank journal" is a crank journal supporting wall portion, and "a connecting surface of a construction member supporting the crank journal" is a connecting surface of the crank journal supporting wall portion.

Accordingly, in the first aspect of the present invention, the pair of the oil groove portions 13a and 13b is provided in the inner circumferential surface portion 17 of the crank journal bearing 11 to extend across the connecting surface of the construction member 55 supporting the crank journal formed along the moving direction of the piston 32 and opposed to each other, and the oil groove portions 13a and 13b are formed along the direction of the combustion load acting toward directing the crank journal 10 within the cylinder 12 and are not formed in a portion where the combustion load directly acts.

As a result, in the first aspect of the present invention, a pressure receiving area of the portion where the combustion load directly acts in the crank journal bearing can be secured to be large, so that the combustion load of the engine can be sufficiently supported by the crank journal bearing 11, and a predetermined pressure-resistive load regarding the crank journal bearing 11 can be secured.

Since the lubricating oil supplying passage 28 for supplying the lubricating oil to the connecting rod bearing 22 is provided between the crank journal 10 and the crank pin 20, one end portion 29 of which is opened to the groove portions 13a and 13b provided in the crank journal bearing 11, the other end portion 30 of which is opened to the inner circumferential surface portion 23 of the connecting rod bearing 22, the lubricating oil can be supplied to the connecting rod bearing 22 so that the inner circumferential surface portion of the connecting rod bearing 22 is lubricated.

According to the second aspect of the present invention, an oil groove portion 26 is provided in an inner circumferential surface portion 23 of a rod 24 side of the connecting rod bearing 22, and a lubricating oil supplying passage 28 is provided between the crank journal 10 and the crank pin 20, one end portion 29 of which is opened to the oil groove portions 13a and 13b provided in the crank journal bearing 11, and the other end portion 30 of which is opened to the oil groove portion 26 provide in the inner circumferential surface portion 23 of the connecting rod bearing 22.

Therefore, according to the second aspect of the present invention, since the lubricating oil supplying passage 28 is provided between the oil groove portions 13a and 13b of the crank journal bearing 11 and the oil groove portion 26 of the connecting rod bearing 22, and this lubricating oil supplying passage 28 is opened to the oil groove portions 13a and 13b at a predetermined rotational angle, the lubricating oil pressured by an oil pump is supplied to the oil groove portion 26 of the connecting rod bearing 22.

Therefore, according to the second aspect of the present invention, in addition to the effect of the first aspect of the present invention, since the lubricating oil within the oil groove portion 26 of the connecting rod bearing 22 is spread to a slidingly contacting surface 35 between the connecting rod bearing 22 and the crank pin 20, more lubricating oil is supplied between the crank pin 20 and the connecting rod bearing 22 to provide excellent lubrication.

Further, since the oil groove portion 26 is provided in the inner circumferential surface portion 23 of the rod 24 in the connecting rod bearing 22, the lubricating oil can be appropriately supplied to the inner circumferential surface portion 23 of the rod 24 of the connecting rod bearing 22, where the large combustion load acts and the more lubrication oil is required.

According to the third aspect of the present invention, in the crank journal bearing 11, the pair of the oil groove portions 13a and 13b is provided opposedly to each other with a predetermined distance in a radial direction of the cylinder 12, and the lubricating oil supplying passage 28 is formed as a single, continuous supply passage.

Therefore, according to the third aspect of the present invention, since the pair of the oil groove portions 13a and 13b is provided in the inner circumferential surface portion 17 of the crank journal bearing 11 with the predetermined distance in the radial direction of the cylinder 12, and the oil groove portions 13a and 13b are not provided in the portion where the combustion load directly acts, the pressure receiving area regarding the combustion load within the cylinder 12 can be secured to be large, and the combustion load of a predetermined magnitude can be supported by the crank journal bearing 11.

As a result, according to the third aspect of the present invention, a predetermined pressure-resistive load against the crank journal bearing 11 can be secured.

Further, according to the third aspect of the present invention, the lubricating oil supplying passage 28 is formed as the single supply passage, and no corner portion is formed at an opening portion, which may otherwise be formed in a connecting part when a plurality of supply passages are formed within the crankshaft 19 to be connected one another.

Therefore, according to the third aspect of the present invention, in addition to the effects of the first and second aspects of the present invention, there is provided an effect that the stress concentrated at the corner portion of the opening portion is prevented.

According to the fourth aspect of the present invention, the lubricating oil supplying passage 28 is so designed that when an end portion 29 at the crank journal 10 is opened to a lower end portion 33 of the oil groove portion 13a formed in the crank journal bearing 11, an end portion 30 at the crank pin 20 side is opened to the oil groove portion 26 provided in the connecting rod bearing 22, and when the end portion 29 at the crank journal 10 of the lubricating oil passage 28 is opened to a lower end portion 34 of the other opposing oil groove portion 13b in association with the rotation of the crankshaft 19, the end portion 30 at the crank pin 20 of the lubricating oil supplying passage 28 is opened to the oil groove portion 26 provided in the inner circumferential surface portion 23 of the connecting rod bearing 22.

Therefore, when the crankshaft 19 is rotated so that the end portion 29 at the crank journal 10 of the lubricating oil supplying passage 26 provided in the crankshaft 19 reaches the portion between the pair of the oil groove portions 13a and 13b, the end portion 29 is confronted with the bearing inner circumferential surface portion 17, and almost no lubricating oil within the oil grooves portions 13a and 13b flows into the lubricating oil supplying passage 28. However, according to the fourth aspect of the present invention, using the oil groove portion 26 of the connecting rod bearing 22, the portion where no lubricating oil is flowed in the connecting rod bearing can be lubricated.

Consequently, according the fourth aspect of the present invention, in addition to the effects of the third aspect of the present invention, since the lubricating oil from the oil groove portions 13a and 13b of the crank journal bearing 11 through the lubricating oil supplying passage 28 is supplied continuously, the lubricating oil to the connecting rod bearing can be supplied excellently.

The fifth aspect of the present invention is characterized in that the oil groove portion 26 of the connecting rod bearing 22 is provided to be spaced from the lower end portion 25 of the rod 24 of the connecting rod 21.

Therefore, according to the fifth aspect of the present invention, since no oil groove portion is provided in the corresponding portion 42 just below the lower end portion 25 of the rod 24 where the largest combustion load acts in the connecting rod 21, the pressure receiving area of the corresponding portion 42 of the connecting rod bearing 22 just below the lower end of the rod 24 is not reduced even if the oil groove portion 26 is provided in the connecting rod 22.

Therefore, even if the oil groove portion 26 is provided in the connecting rod bearing 22, a predetermined pressure-resistive load against the connecting rod bearing 22 can be secured, and consequently, it is possible to provide the lubricating oil supplying structure for the crankshaft, which is free from the increase in the bearing width dimension and the increase in the engine weight.

The sixth aspect of the present invention is characterized in that the lubricating oil supplying passage 36 is so designed that one end portion 37 is opened to the oil groove portions 13a or 13b provided in the crank journal bearing 11, and the other end portion 38 is opened to a portion 39 of the connecting rod bearing 43, which corresponds to the lower end portion 25 of the rod 24 of the connecting rod 21.

Therefore, according to the sixth aspect of the present invention, in addition to the effects of the first aspect of the present invention, the lubricating oil is smoothly supplied to the corresponding portion 39 of the connecting rod bearing 43, which corresponds to the lower end portion 25 of the rod 24 where the most action of the combustion load is the most received.

Thus, by defining a relationship of the lubricating oil supplying passage 36 to the oil groove portions 13a and 13b provided in the crank journal bearing 11, the lubricating oil can be supplied to the highest pressure surface portion, i.e. the corresponding portion 39, even if an oil passage is formed by the single lubricating oil supplying passage 36. No lubrication failure is caused in the connecting rod bearing 43.

Therefore, since no lubrication failure is caused in the connecting rod bearing 43, and since the oil passage is formed as the single, continuous supply passage by the lubricating oil supplying passage 36, it is possible to eliminate the stress concentration which occurs at the corner portion formed in the connecting portion where a plurality of the supply passages are connected together.

Since no oil groove portion is provided in the portion 39 of the connecting rod bearing 43 corresponding to the lower end portion 25 of the rod 24, it is free from the reduction of the pressure receiving area, and even if the large combustion load acts, the load can be surely supported, and the large pressure-resistive load can be secured.

The seventh aspect of the present invention is characterized in that: the lubricating oil supplying passage 70 is constructed of a radial direction supplying passage portion 71 that is provided along the radial direction of the crank journal 73 and that is opened to the oil groove portions 75a and 75b, and an axial direction supplying passage portion 72 which is provided along the axial direction of the crank journal 73, one end portion of which is opened to the radial direction supplying passage portion 71 and the other end portion of which is opened to an inner circumferential surface portion of the connecting rod bearing 22 and the radial direction supplying passage portion 71 is so designed that in association with the rotation of the crank journal 73, either one of the end portions 80a and 80b is opened to the oil groove portions 75a and 75b.

Therefore, according to the seventh aspect of the present invention, since the both end portions 80a and 80b of the radial direction supplying passage portion 71 are opened to the crank journal surface portion 77, and in association with the rotation of the crank journal 73, either one of the end portions 80a and 80b is opened to the oil groove portions 75a and 75b, either one or both of the end portions 80a and 80b of the radial direction supplying passage 71 is constantly opened to the oil groove portions 75a and 75b even if the crank journal 73 is rotated, the lubricating oil within the oil grooves 75a and 75b flows into the radial direction supplying passage portion 71 through the end portions 80a and 80b, and is supplied to the connecting rod bearing 22 through the axial direction supplying passage portion 72.

The eighth aspect of the present invention is characterized in that the radial direction supplying passage 71 is so designed that an angle γ formed between the end portions 80a and 80b of the radial direction supplying passage portion 71 and the crank journal axial center 76 is larger than an angle β formed between the opposing end portions 84 and 85 of the pair of the oil groove portions 75a and 75b and the crank journal axial center 76, but smaller than an angle α formed between the end portions, 84, 84, 85, 85 of the one oil groove portion 75 and the crank journal axial center 76.

Therefore, according to the eighth aspect of the present invention, due to the rotational phase of the crank journal 73, in the case where the radial direction supplying passage portion 71 is positioned to be confronted with the pair of opposing oil groove portions 75a and 75b, both end portions 80a and 80b of the radial direction supplying passage portion 71 are constantly opened to the oil groove portions 75a and 75b, and even in the case where it is positioned to be confronted with the crank journal bearing surface portions 77a and 77b between the one oil groove portion 75a and the other oil groove portion 75b, either one or both of the end portions 80a and 80b is constantly opened to the oil groove portion 75a or 75b.

As a result, according to the eighth aspect of the present invention, since the radial direction supplying passage portion 71 is opened at least through either one of the end portions 80a and 80b to the oil groove portions 75a and 75b regardless of the rotational angle of the crank journal 73, the lubricating oil flows into the radial direction supplying passage portion 71 from the oil groove portions 75a and 75b, and the lubricating oil is constantly supplied to the connecting rod bearing through the axial direction supplying passage portion 72.

The ninth aspect of the present invention is characterized in that a hole portion 79 is formed in the crank journal 73 at the axial direction central portion extending along the axial direction, and the radial direction supplying passage portion 71 is disposed so as to avoid the hole portion 79.

Therefore, according to the ninth aspect of the present invention, even if the radial direction supplying passage portion 71 is formed to avoid the hole portion 79 formed in the central portion, since such a relative relationship is met between the radial direction supplying passage portion 71 and the oil groove portions 75a and 75b that the angle γ formed between the end portions 80a and 80b of the radial direction supplying passage portion 71 and the crank journal axial center 76 is larger than the angle β formed between the opposing end portions 84 and 85 of the pair of the oil groove portions 75a and 75b and the crank journal axial center 76, but smaller than the angle α formed between the end portions 84, 84, 85, 85 of the one oil groove portion 75 and the crank journal axial center 76, the lubricating oil from the oil groove portions 75a and 75b through the radial direction supplying passage 71 flows into the radial direction supplying passage 71, and is supplied to the connecting rod bearing through the axial direction supplying passage portion 72.

Conventionally, when a lubricating oil supplying passage is formed in a journal portion of a crankshaft having a hole portion inside the crank journal 73 along the axial direction thereof, i.e. a hollow hole corresponding to the hole portion 79 in the crank journal 73 in the present embodiment, the following method has typically been used.

For example, a hole portion is formed as a preparation hole to penetrate through the hole portion 79, i.e. the hollow hole, in the radial direction of the crank journal 73, and a pipe is pressure-inserted and fixed to the preparation hole to be opened to the oil groove portion so that a supply passage in the crank journal radial direction constructing a lubricating oil supplying passage which corresponds to the radial direction supporting passage 71 is formed.

As another different method, a tube is pressure-inserted along the axial direction into the hole portion 79, i.e. the hollow hole, and a lubricating oil supplying passage opened to the supply oil portion 83 to which the lubricating oil is supplied from the oil pump is formed between the outer circumferential surface of the tube and the inner circumferential surface of the hole portion 79.

However, in the conventional lubricating oil supplying passage is formed in the crank journal provided with the conventional hollow holes, the former method requires complicated processing work for the preparation hole that must be preliminarily formed as the hole portion penetrating through the hollow hole, and also requires complicated pressure-insertion work of the pipe into the preparation hole. Further, when the pipe is pressure-inserted into the preparation hole, a flaw may be caused on the inner circumferential surface portion of the preparation hole, and the preparation hole may be partially damaged, resulting in reduction in strength of the crank journal.

In the latter method, it is not easy to align and fix the hollow hole in the tube, and the fixing work of the tube to the hollow hole is troublesome. Further, if the length dimension of the tube in the axial direction is made large in order to overcome the difficulty in alignment, the width of the formed lubricating oil supplying passage become large, resulting in that the flowing-in lubricating oil is likely to stay in the inside, and there is possibility that the sludge contained in the lubricating oil may accumulated in the inside.

As compared with these conventional methods, the lubricating oil supplying structure in the crank journal bearing according to the ninth aspect of the present invention is advantageous in that it is unnecessary to form the hole portion as the preparation hole penetrating through the hollow hole of the crank journal 73 since the radial direction supplying passage portion 71 is disposed to avoid the hole portion 79. As a result, there is no case that the inside of the preparation hole is partially damaged when the pipe is pressure-inserted into the preparation hole. Accordingly, it is possible to eliminate a possibility that strength of the crank journal 73 is lowered.

Since conventionally conducted step of preliminarily forming the preparation hole penetrating through the hollow hole of the crank journal and pressure-inserting the pipe into the preparation hole, and a step of pressure-inserting the tube into the hollow hole, it is possible to reduce the numbers of manufacturing process when the lubricating oil supplying passage of the crankshaft 19 is formed. Consequently, it is possible to reduce the manufacturing cost when the lubricating oil supplying passage is formed.

DETAILED DESCRIPTION OF THE PREFERRED EMBODIMENTS

The present invention will be described in detail with reference to embodiments shown in the accompanying drawings.

Figure 1:
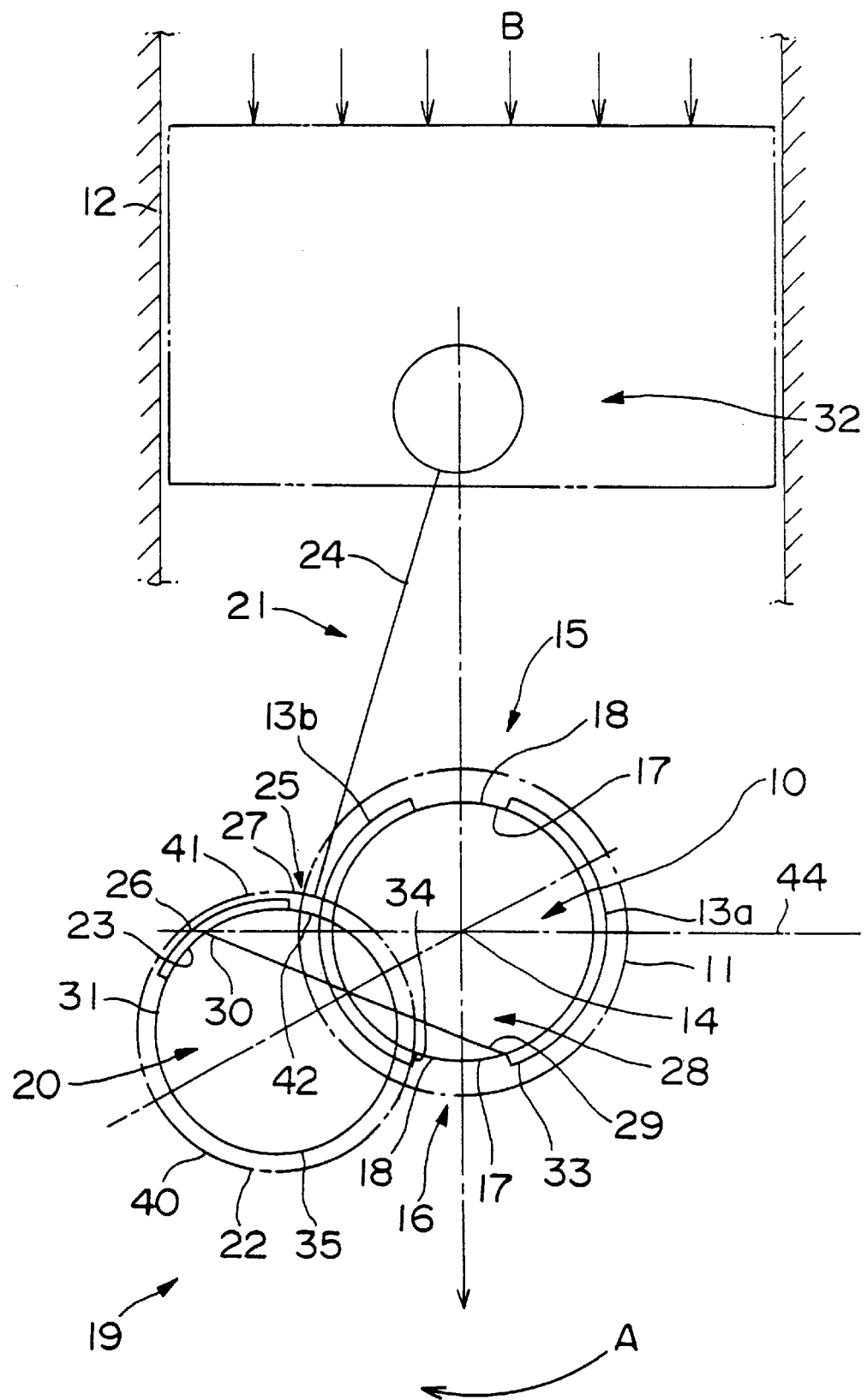
FIG. 1 is a view schematically showing an embodiment of a lubricating oil supplying structure for a crankshaft according to the present invention in a state where an end portion of a crankshaft bearing side of a lubricating oil supplying passage is opened to one oil groove portion, and the other end portion of the lubricating oil supplying passage is opened to an oil groove portion provided in a connecting rod bearing, so that the lubricating oil of the oil groove portion of the crank journal bearing is supplied to the oil groove portion of the connecting rod bearing.

In an embodiment, a lubricating oil supplying structure for a crankshaft according to the present invention is applied to an engine of a serial or V-type cylinder arrangement. As shown in FIG. 1, a cylinder shaft 19 is rotated in a clockwise direction (in an arrow A direction in FIG. 1) by the action of the vertical reciprocating movement of a piston 32 due to a combustion load generated within a cylinder 12.

A crank journal 10 of the crankshaft 19 is supported by a crank journal bearing 11, and this crank journal bearing 11 is provided with a pair of oil groove portions 13a and 13b located at a predetermined distance in a diametrical direction of the cylinder 12.

In the embodiment, the oil groove portions 13a and 13b are provided in the right and left side portions of an inner circumferential surface portion 17 of the crank journal bearing 11 to extend in the same angular range from an axial center 14 of the crank journal 10 to the right and left portions of the crank journal 10 and to enclose both side portions of the crank journal 10. Therefore, no oil groove portion is provided at each of an upper end portion 15 and a lower end portion 16 of the crank journal bearing 11, and the inner circumferential surface portion 17 of the crank journal bearing 11 is facing a surface portion 18 of the crank journal 10.

The lubricating oil pressured by an unillustrated oil pump is supplied through a predetermined supply passage to the pair of the oil groove portions 13a and 13b, and then enters into between the inner circumferential surface portion 17 of the crank journal 10 and the surface portion 18 of the crank journal bearing 11 for lubrication between the crank journal 10 and the crank journal bearing 11.

In this embodiment, an oil groove portion 26 is provided partially in an inner circumferential surface portion 23, at the rod 24 side, of a connecting rod bearing 22 of a connecting rod 21 journaled by a crank pin 20 of the crankshaft 19, namely, as a portion of the inner circumferential surface portion 23, which is circumferentially spaced at a predetermined distance from a lower end portion 25 of the rod 24. This oil groove 26 in this embodiment is provided at an upper portion 41 of the connecting rod bearing 22 and in the left side portion with respect to the rod 24 in the drawing. In this embodiment, since the crankshaft 19 is rotated in the arrow A direction in the drawing as described above, it is necessary to provide the oil groove 26 of the connecting rod bearing 22 in the above-mentioned location, i.e. at the upper portion 41 of the connecting rod bearing 22 and at the left side portion with respect to the rod 24.

Further, a lubricating oil supplying passage 28 is provided between the oil groove portion 13 of the crank journal bearing 11 and the oil groove portion 26 of the connecting rod bearing 22.

The lubricating oil supplying passage 28 is formed by a single, continuous supply passage, and one end portion 29 thereof is opened to the oil groove portion 13 provided in the crank journal bearing 11, and the other and portion 30 thereof is opened to the oil groove portion 26 provided in the connecting rod bearing 22.

Specially, the lubricating oil supplying passage 28 is formed between the surface portion 18 of the crank journal 10 and the crank pin surface portion 31 within the crankshaft 19. The rotational movement of the crankshaft 19 associated with the vertical reciprocating movement of the piston 32, and the relative positional relationship between the oil groove portion 26 provided in the connecting rod bearing 22 and the oil groove portion 13 provided in the crank journal bearing 11 causes the end portion 30 at the crank pin 20 side to be opened to the oil groove portion 26 provided in the connecting rod bearing 22 when the and portion 29 at the side of crank journal 10 is opened to the lower and portion 33 of the one oil groove portion 13a formed in the crank journal bearing 11, and, accompanying the rotational movement of the crank shaft 19, causes the end portion 30, at the side of the crank pin 20, of the lubricating oil supplying passage 28 to be opened to the oil groove portion 26 provided in the inner circumferential surface portion 23, at the rod 25 side, of the connecting rod bearing 22 when the end portion 29, at the side of the crank journal 10, of the lubricating oil supplying passage 28 is moved to the lower end portion 34 of the other oil groove 13b opposite to the oil groove portion 13a.

Therefore, the length of the oil groove portions 13a and 13b at the side of the crank journal 10, the arranged angles of the oil groove portions 13a and 13b at the side of the crank journal 10 side, the length dimension of the oil groove portion 26 of the connecting rod bearing 22, the arranged angle of the oil groove portion 26, and opened positions of the lubricating oil passage 28 are set so as to satisfy the above-described relative positional relationship.

Hereafter, effects of the lubricating oil supplying structure for the crankshaft according to the present embodiment will be described.

In the present embodiment, the crankshaft 19 is rotated in the arrow A direction by the connecting rod 21 and the piston 32 vertically reciprocating within the cylinder 12. In this case, with the rotation of the crankshaft 19, when the oil groove portion 13a is lowered while the and portion 29 of the side of the crank journal 10 of the lubricating oil supplying passage 28 is opened to the oil groove portion 13a, the lubricating oil in the oil groove portion 13a supplied by the oil pump flows into the lubricating oil supplying passage 28 from the end portion 29 at the side of the crank journal that is opened to the oil groove portion 13a, so that the lubricating oil is supplied through the lubricating oil supplying passage 28 to a sliding contact surface 35 between the connecting rod bearing 22 and the crank pin 20.

Thereafter, as shown in FIG. 1, as the crankshaft 19 is rotated the end portion 29 at the side of the crank journal of the lubricating oil supplying passage 28 reaches the lower end portion 33 of the oil groove portion 13a, and the end portion 30, at the side of the crank pin 20, of the lubricating oil supplying passage 28 is opened to the oil groove portion 26 of the connecting rod bearing 22, the end portion 30, at the side of the crank pin 20 side, of the lubricating oil supplying passage 29 is opened to the oil groove portion 26. Accordingly, in this case, the lubricating oil within the oil groove portion 13a is supplied through the lubricating oil supplying passage 28 to the oil groove portion 26 where the lubricating oil is accumulated, and the lubricating oil within the oil groove portion 26 flows to the sliding contact surface 35 between the connecting rod bearing 22 and the crank pin 20 to lubricate the slidingly contacting surface 35.

In association with further rotation of the crankshaft 19, the end portion 29 of the side of the crank journal of the lubricating oil supplying passage 29 is rotated to reach the lower end portion 16 of the crank journal bearing 11, i.e. the portion between the oil groove portion 13a and the other groove portion 13b opposite thereto. In this case, since no oil groove portion is provided in the lower end portion 16, almost no lubricating oil is newly supplied into the lubricating oil supplying passage 28.

Figure 2:
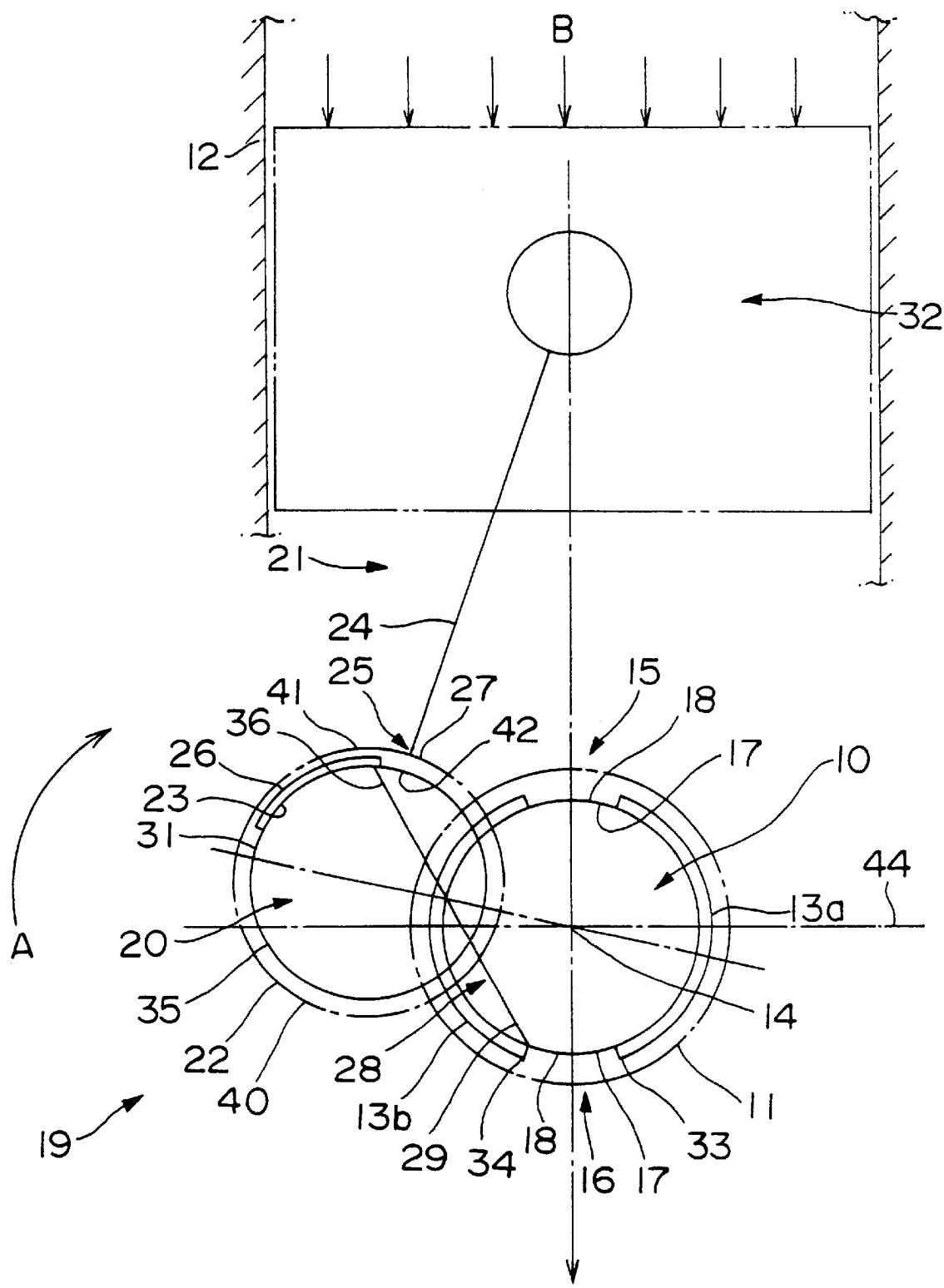
FIG. 2 is a view schematically showing the embodiment of the lubricating oil supplying structure for the crankshaft according to the present invention in a state where the crankshaft is further rotated so that the end portion of the crank journal bearing side of the lubricating oil supplying passage is opened to the other oil groove portion, and the other end portion of the lubricating oil supplying passage is opened to the oil groove portion provided in the connecting rod bearing, and accordingly the lubricating oil of the oil groove portion of the crank journal bearing is supplied to the oil groove portion of the connecting rod bearing.

Thereafter, as shown in FIG. 2, when the end portion 29 of the crank journal of the lubricating oil supplying passage 28 is further rotated in association with the rotation of the crankshaft 19 to pass through the lower and portion 16 and reach the lower end portion 34 of the other oil groove portion 13b opposite to the oil groove portion 13a, the crank journal side end portion 29 is opened to the oil groove portion 13b. In this case, the lubricating oil supplied to the oil groove portion 13b flows into the lubricating oil supplying passage 28, and the supply of the lubrication through the lubricating oil supplying passage 29 to the oil groove portion 26 of the connecting rod bearing 22 is initiated again.

Accordingly, in the lubricating oil supplying structure for the crankshaft according to the present embodiment, although the combustion load generated within the cylinder 12 acts on the crank journal 10 along the axial direction of the cylinder 12 through the piston 32 and the connecting rod 21 as shown by an arrow B in FIGS. 1 and 2, the above-mentioned combustion load is hold by the surface portion 18 of the crank journal bearing 11 since the groove portions 13a and 13b are provided to keep clean from the upper end portion 15 and the lower end portion 16 of the crank journal bearing 11, which are located just below the axial center of the cylinder 12 where the combustion load directly acts the most largely.

Therefore, the lower end portion 16 of the crank journal bearing 11 is free from the reduction of the pressure receiving area caused due to the provision of the oil groove portion, and can reliably hold the combustion load of a predetermined magnitude. As a result, it is possible to secure a predetermined pressure-resistive load in the crank journal bearing 11.

In the case where the end portion 29 at the side of the crank journal of the lubricating oil supplying passage 28 is positioned at the lower end portion 16 of the crank journal bearing 11, which is the portion between the pair of the oil groove portions 13a and 13b, in association with the rotation of the crankshaft 19, that is, during when the end portion 29 of the crank journal side of the lubricating oil supplying passage 28 reaches to the lower end portion 34 of the oil groove portion 13b from the lower end portion 33 of the oil groove portion 13a of the crank journal bearing 11, the supply of lubricating oil from the lubricating oil supplying passage 28 is reduced when the end portion 30 of the crank pin side in the lubricating oil supplying passage 28 is moving around the inner circumferential surface portion 23 of the connecting rod bearing 22.

In the above condition, the end portion 30 of the crank pin of the lubricating oil supplying passage 28 is positioned within the oil groove portion 26 of the connecting rod bearing 22. Accordingly as shown in FIG. 1, the end portion 29 of the crank journal side of the lubricating oil supplying passage 28 is lowered to the oil groove portion 13a, and the lubricating oil is supplied to the oil groove portion 26 via the lubricating oil supplying passage 28 during reaching to the lower end portion 33. As shown in FIG. 2, during when the end portion 29 of the crank journal side of the lubricating oil supplying passage 28 reaches to the lower end portion 34 of the oil groove passage 13b, the connecting rod bearing 22 can be supplied with the lubricating oil by already supplied lubricating oil in the oil groove passage 26 of the connecting rod bearing 22.

As a result, according to the embodiment, even where no crank journal bearing is provided as in the lower end portion 16 of the crank journal bearing 11, the lubricating oil can be supplied continuously to the inner circumferential surface portion 23 of the connecting rod bearing 22 using the oil groove portion 26 of the connecting rod bearing 22.

Further, in the case where the lubricating oil is supplied to the groove portion 26 of the connecting rod bearing 22, the lubricating oil within the oil groove portion 26 flows to the sliding contact surface 35 between the connecting rod bearing 22 and the crank pin 20. Accordingly, more lubricating oil is supplied to the sliding contact surface 35 between the crank pin 20 and the connecting rod bearing 22 to provide excellent lubrication between the crank pin 20 and the connecting rod bearing 22.

Since the oil groove portion 26 is provided to the inner circumferential surface portion 23 at the side of the rod 24 in the upper portion 41, where the large combustion load acts in the connecting rod bearing 22, the lubricating oil can be supplied to that portion where the large combustion load acts and thus the lubrication is most required.

Further, since the oil groove portion 26 of the connecting rod bearing 22 is provided while being spaced at a predetermined distance in the circumferential direction of the connecting rod bearing from the lower end portion 25 of the rod 24 of the connecting rod 21, no oil groove portion is provided at a portion 42 corresponding to the lower end portion 25 of the rod 24 where the largest combustion load acts on the connecting rod 21. Therefore, the portion 42, corresponding to the rod lower end portion 25, of the connecting rod bearing 22 is free from the reduction of the pressure receiving area.

Accordingly, in the lubricating oil supplying structure for the crankshaft according to the present embodiment, even if the oil groove portion 26 is provided in the connecting rod bearing 22, a predetermined pressure-resistive load can be secured.

Further, in the lubricating oil supplying structure for the crankshaft according to the present embodiment, the lubricating oil supplying passage 28 is formed as a single, continuous supply passage. Consequently, there is no sharp corner portion which may exist at an opening portion in a connecting part when a plurality of supply passages are formed within the crankshaft 19 to be connected one another.

Accordingly, in the crankshaft 19 onto which the large combustion load acts, it is possible to eliminate the stress concentration which occurs at the corner portion formed in the connecting part of each supply passage in the case where a plurality of the supply passages are connected together. Consequently, it is unnecessary to enlarge the diameter of the crank journal and increase the weight of the crankshaft in order to cope with this stress concentration.

Figure 3:
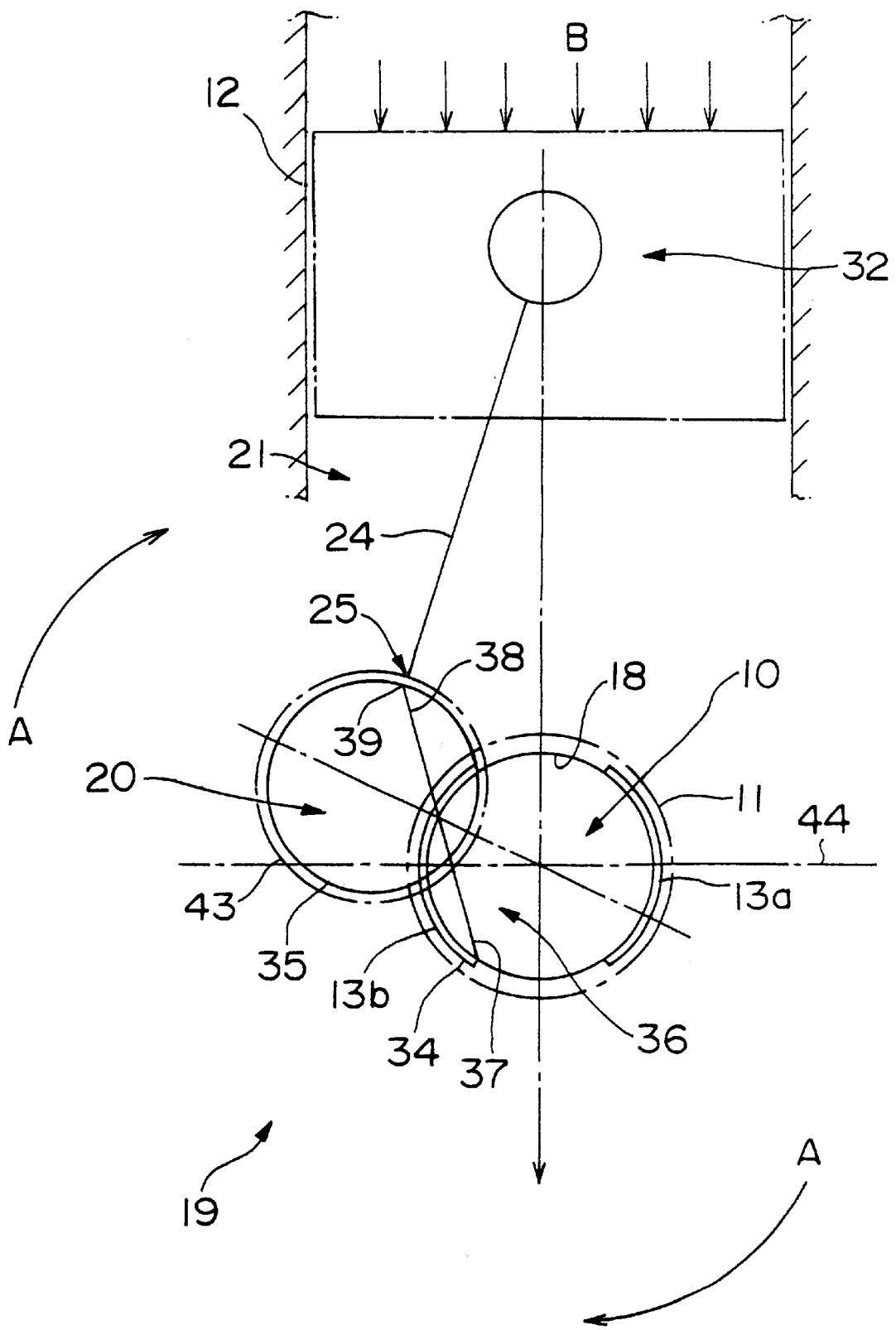
FIG. 3 is a view schematically showing another embodiment of the lubricating oil supplying structure for the crankshaft according to the present invention in a state where the one end portion of the crank bearing side of the lubricating oil supplying passage is opened to the oil groove portion, and the other end portion is opened to a portion of the bearing corresponding to the rod lower end portion of the connecting rod.

FIG. 3 in a schematic view showing another embodiment of the lubricating oil supplying structure for the crankshaft according to the present invention.

In this embodiment, the same oil groove portions 13a and 13b as those of the former embodiment are provided in the crankshaft bearing 11 for the crank journal 10. However, tho present embodiment differs from the former embodiment in that no oil groove is provided in a connecting rod bearing 43 for the crank pin 20.

A lubricating oil supplying passage 36 provided within the crankshaft 19 is formed as a single, continuous supply passage, and one end 37 thereof is opened to the oil groove portion 13b provided in the crank journal bearing 11, whereas the other end thereof is opened to a portion 39 of the connecting rod bearing 43 provided between the connecting rod 21 and the crank pin 20. The portion 39 of the connecting rod bearing 43 corresponds to the lower end portion 25 of the rod 24 of the connecting rod 21.

That is, in the present embodiment, the lubricating oil supplying passage 36 is so designed that, when the end portion 37 of the side of the crank journal is opened to the one oil groove portion 13b during the rotational movement of the crankshaft 19, the other end portion 38 is opened to the portion 39 corresponding to the lower and portion 25 of the rod 24 of the connecting rod 21. To this and, the length and angular arrangement of the oil groove portion 13b, and the position of the opening portions formed at both ends 37 and 38 of the lubricating oil supplying passage 36 are set.

Therefore, in the lubricating oil supplying structure for the crankshaft according to the present embodiment, in the case where the end portion 37 of the side of the lubricating oil supplying passage 36 is opened to the one oil groove portion 13a in association with the rotation of the crankshaft 19 in the arrow A direction in FIG. 3, the lubricating oil is supplied from the oil groove portion 13a through the lubricating oil supplying passage 36 to the sliding contact surface 35 between the crank pin 20 and the connecting rod bearing 43 to lubricate the slidingly contacting surface 35.

Then, in association with the rotation of the crankshaft 19, at the end portion 37 of the crank journal is lowered along the inner circumferential surface of the oil groove portion 13a and the end portion 38 of the side of pin is elevated along the slidingly contacting surface 35 between the crank pin 20 and the connecting rod bearing 43.

When the end portion 37 of the crank journal is positioned at the lower end portion 34 of the oil groove portion 13b at the crank journal side, the end portion 37 of the side of the crank journal side is opened to the oil groove portion 13b, and since the end portion 38 of the side of the crank pin is opened to the portion 39 corresponding to the lower end portion 25 of the rod 24 of the connecting rod 24, the lubricating oil within the oil groove portion 13b is supplied through the lubricating oil supplying passage 36 to the portion 39 corresponding to the lower end portion 25 of the rod 24 of the connecting rod 21.

Therefore, since the lubricating oil within the oil groove portion 13b of the crank journal bearing 11 is supplied through the lubricating oil supplying passage 36 to the portion 39 of the connecting rod bearing 43 corresponding to the lower end portion 25 of the rod 24 of the connecting rod 21, the lubricating oil is surely supplied to the portion 39 of the connecting rod bearing 43, which corresponds to the lower end portion 25 of the rod 24 where the largest combustion load acts on the connecting rod 21, thereby lubricating the sliding contact surface 35 between the connecting rod bearing 22 and the crank pin 20.

In the lubricating oil supplying structure for the crankshaft according to the present embodiment, the lubricating oil supplying passage 36 is formed as a single, continuous supply passage. Consequently, there is no sharp corner portion which may exist at an opening portion in a connecting part when a plurality of supply passages are formed within the crankshaft 19 to be connected one another.

Accordingly, in the crankshaft 19 onto which the large combustion load acts, it is possible to eliminate the stress concentration which occurs at the corner portion formed in the connecting part of each supply passage in the case where a plurality of the supply passages are connected together. Consequently, it is unnecessary to enlarge the diameter of the crank journal and increase the weight of the crankshaft in order to cope with this stress concentration.

In the lubricating oil supplying structure for the crankshaft according to the present embodiment, since no oil groove portion is provided at the portion 39 of the connecting rod bearing 22 corresponding to the lower end portion 25 of the rod 24, the pressure receiving area can be secured to surely receive the largest combustion load generated and to secure a large pressure-resistive load.

In the embodiments described above, the present invention has been described with reference to an example in which the cylinder arrangement of the engine is serial or V-type. However, the present invention is not limited to the embodiments described above. The lubricating oil supplying structure for the crankshaft according to the present invention can be applied to a so-called horizontal, opposing type engine in which axes of a plurality of cylinders are arranged horizontally so that the cylinders are opposed to one another.

That is, the lubricating oil supplying structure for crankshaft according to the embodiments described above has been described with reference to an example in which the pair of the opposing oil groove portions 13a and 13b of the crank journal bearing 11 is spaced at the predetermined distance in the diametrical direction of the cylinder disposed vertically in the engine, i.e. in the right and left direction of the engine, so as to enclose both sides portions of the crank journal 10. In the horizontal, opposing type engine, the oil groove portions 13a and 13b are arranged to be opposite to each other in the vertical direction of the engine for use.

In the case where the oil groove portions 13a and 13b are arranged to be opposite to each other in the vertical direction in the horizontal, opposing engine, since the portions of the crank journal bearing 11, which are formed between the oil groove portions 13a and 13b as the upper end portion 15 and the lower and portion 16 in the present embodiment, are arranged in the axial direction of a pair of cylinders opposed to each other in the horizontal, opposing type engine, the combustion loads generated in the opposing manner are hold respectively by the portions of the crank journal bearing formed between the oil groove portions 13a and the 13b.

Accordingly, in the case where the present invention is practiced in the horizontal, opposing type engine, since the combustion loads generated in the opposing manner are hold respectively by the portions of the crank journal bearing formed between the pair of the oil groove portions 13a and 13b, the pressure receiving area in the crank journal bearing 11 in the horizontal, opposing type engine can be secured, to sufficiently hold the combustion load of the engine.

As a result, a constant pressure-resistive load can be secured in the crank journal bearing 11. Similar to the embodiments described above, in the horizontal, opposing type engine, it is possible to provide the lubricating oil supplying structure for the crankshaft, which can supply ample lubricating oil to the portion of the connecting rod bearing 22 corresponding to the connected part between the connecting rod 21 and the crank pin 20.

Although the embodiments have been described with reference to an example in which "a construction member supporting the crank journal" is a crank journal supporting structure 55 including a crank journal supporting wall portion 66 of a crank case 53 and a bearing cap 56, and "a connecting surface of a construction member supporting the crank journal" is, for example, a connecting surface between the crank journal supporting wall portion 66 of the crank case 53 and the bearing cap 56, the present invention is not limited to these embodiments. In the case of the horizontal, opposing type engine, "a construction member supporting the crank journal" is a crank journal supporting wall portion, and "a connecting surface of a construction member supporting the crank journal" is a connecting surface of the crank journal supporting wall portion.

Although the embodiments have been described with reference to an example in which the connecting rod bearing 22 is provided with the single oil groove portion 26, the present invention is not limited to the described embodiments, and the same and another oil groove portion may be provided in a predetermined portion. In the came where a plurality of oil groove portions 26 are provided in the connecting rod bearing 22 in this fashion, the connecting rod bearing 22 can be well lubricated.

Figure 4:
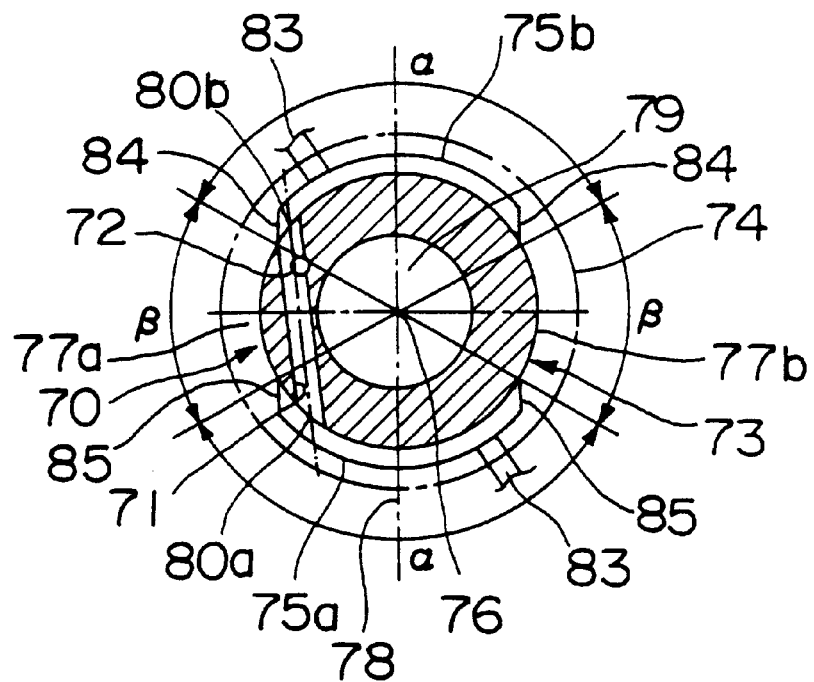
FIG. 4 is a view schematically showing yet another embodiment of the lubricating oil supplying structure for the crankshaft according to the present invention, which is a sectional view schematically showing a state where, in the crank journal inside portion of a hollow construction provided in the axial center portion with a hole portion along the axial direction, a radial direction supplying passage portion opened to the oil groove portion is provided to keep clear from the hole portion.
Figure 5:
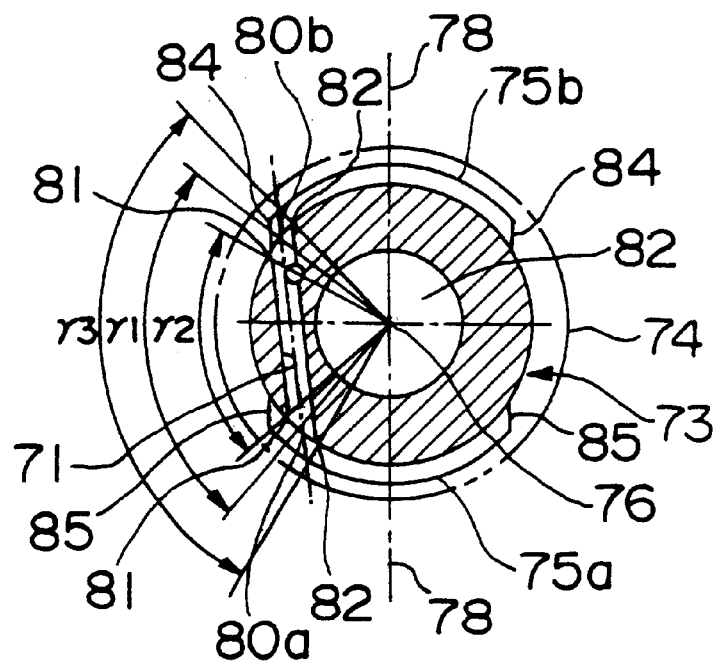
FIG. 5 is a view schematically showing the embodiment shown in FIG. 4 of the lubricating oil supplying structure for the crankshaft according to the present invention, and further showing in detail an angle of the radial direction supplying passage portion to the axial center.
Figure 6:
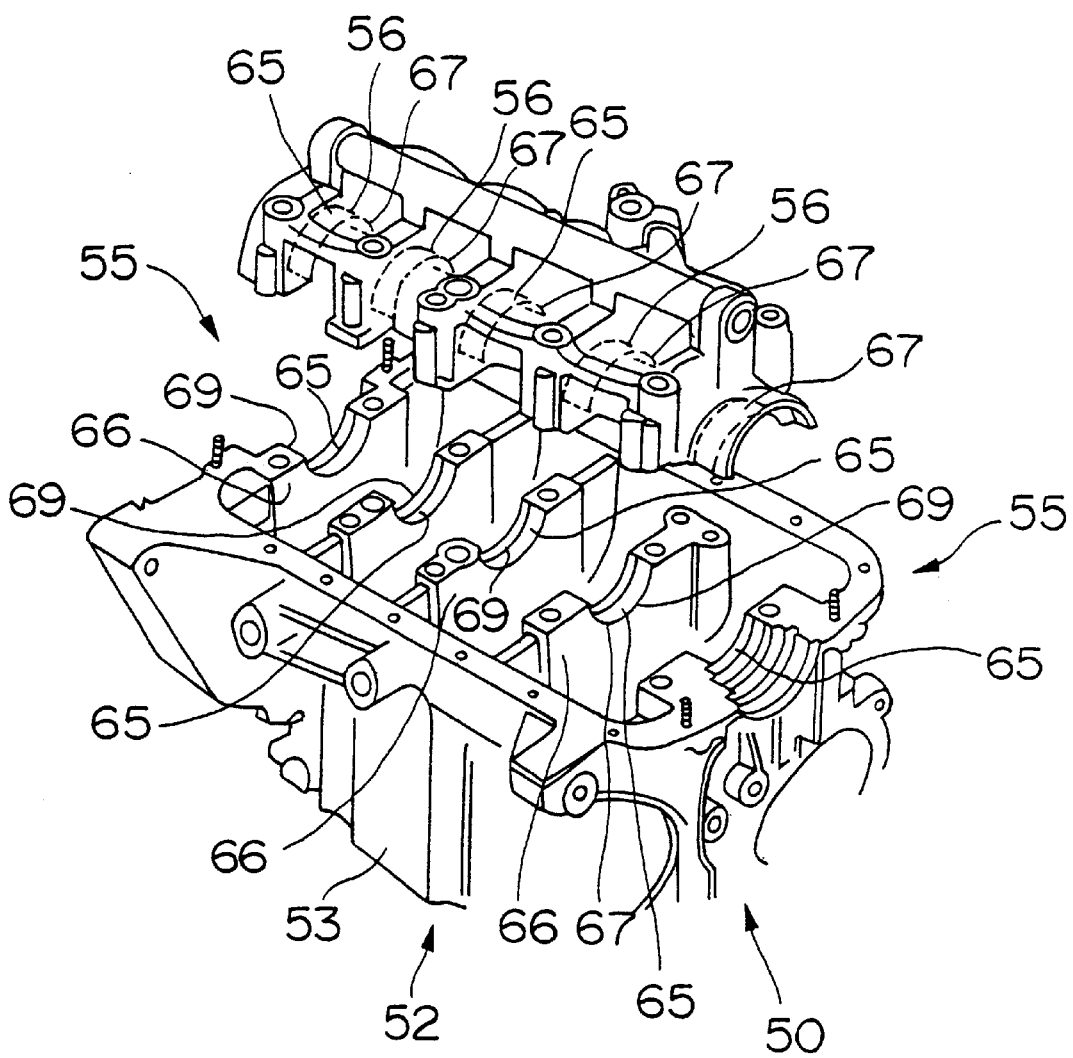
FIG. 6 is an exploded perspective view showing a crank case portion of a cylinder block of an engine as viewed from the back side, and showing a crank journal bearing portion of a crankshaft.
Figure 7:
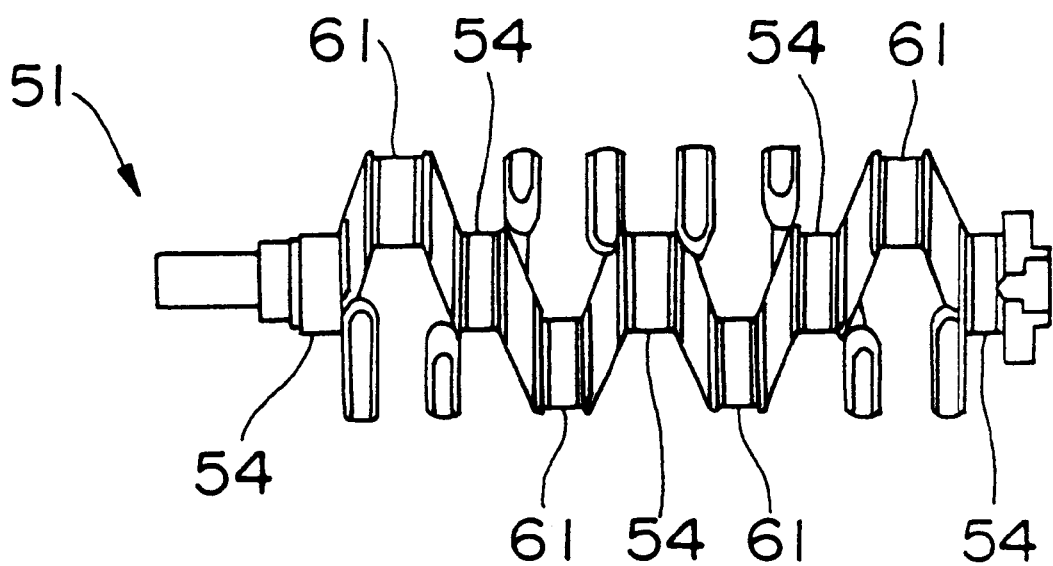
FIG. 7 is a side view generally showing a crankshaft.
Figure 8:
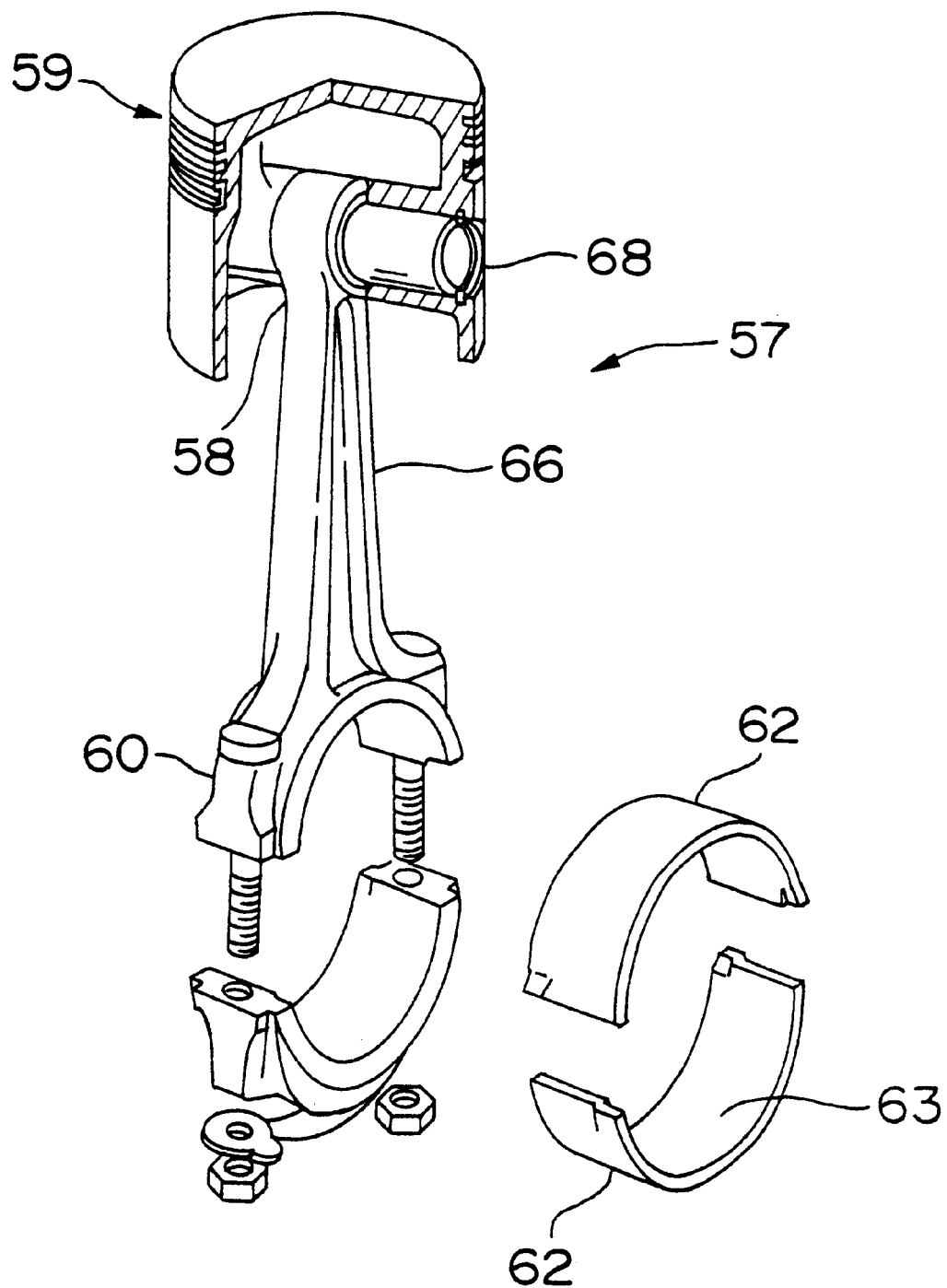
FIG. 8 is an exploded perspective view generally showing a piston, a connecting rod and a connecting rod bearing.

FIGS. 4 and 5 show another embodiment of the lubricating oil supplying structure for the crankshaft according to the present invention.

In this embodiment, a crank journal 73 is formed at a diametrically central portion with a hole portion 79 along an axial direction, so that the crank journal 73 has a hollow configuration.

In the present embodiment, similarly to the crank journal bearing 11 of the embodiments shown in FIGS. 1 to 3, a crank journal bearing 74 is provided with a pair of opposing oil groove portions 75a and 75b which extends across a connecting surface 78 of a construction member supporting the crank journal 73, which is formed along the movement direction of the piston 32 and which is spaced a predetermined distance in a radial direction of the cylinder 12. Oil supply holes. 83 and 83, to which the lubricating oil pressured by the oil pump is supplied, are opened respectively in the oil groove portions 75a and 75b.

The crank journal 73 is provided with a lubricating oil supplying passage 70 inside thereof. This lubricating oil supplying passage 70 is constructed of a radial direction supplying passage portion 71 that is provided along the radial direction of the crank journal 73 and that is opened to the oil groove portions 75a and 75b, and an axial direction supplying passage portion 72 which is provided along the axial direction of the crank journal 73 to be substantially orthogonal to the radial direction supplying passage portion 71, one end portion of which is opened to the radial direction supplying passage portion 71 and the other end portion of which is opened to an inner circumferential surface portion of the connecting rod bearing 22.

The radial direction supplying passage portion 71 is offset to keep clean from the hole portion 79, and formed as a hole portion of an entirely slender cylindrical shape. Both end portions 80a and 80b thereof are opened to a crank journal surface portion 77.

The radial direction supplying passage portion 71 is so formed that an angle γ of the end portions 80a and 80b of the radial direction supplying passage portion 71 with respect to the crank journal axial center 76 is larger than an angle β of the opposing end portions 84 and 85 of the pair of the oil groove portions 75a and 75b with respect to the crank journal axial center 76, but smaller than an angle α of the end portions 84, 84, 85, 85 of the one oil groove portion 75a or 75b with respect to the crank journal axial center.

Here, the above-noted angle γ has three modes as shown in FIG. 5. That is, a first one is an angle γ1 formed between the axial center 76 and central portion of the opening portions formed at the end portions 80a and 80b of the radial direction supplying passage portion 71. In the case where the opening portions are formed at the end portions 80a and 80b of the radial direction supplying passage portion 71, each opening portion is subjected to chamfering, so that the opening portion is formed with an opening portion inner end portion 82 and an opening portion outer end portion 81 that are spaced at a distance slightly larger than the diameter of the radial direction supplying passage portion 71 in conformity with the curvature of the crank journal bearing surface portion 77.

Therefore, a second one exists, which is an angle γ2 formed between the axial center of the crank journal axial center 76 and the opening portion outer end portions 81 and 81 of the end portions 80a and 80b of the radial direction supply passage portion 71. Further, a third one exists, which is an angle γ3 formed between the crank journal axial center 76 and the opening portion inner end portions 82 and 82 of the end portions 80a and 80b of the radial direction supply passage portion 71.

As a result, the three kinds of the angles concerning the radial direction supplying passage portion 71 and the axial center 76, and a relationship between the angle a and the angle β are preferably set to meet both of γ3<α and β>γ2.

This is because, if the relationship of γ3<α is met, in association with the rotation of the crank journal 73, the end portions 80a and 80b of the radial direction supplying passage portion 71 are opened to the oil groove portions 75a and 75b in a state where the radial direction supplying passage portion 71 is facing the oil groove portions 75a and 75b. If the relationship of β>γ2 is met, the end portions 80a and 80b of the radial direction supplying passage portion 71 are opened to the end portions 84 and 85 of the respective oil groove portions 75a and 75b in a state where the. radial direction supplying passage portion 71 is facing the crank journal bearing surface portions 77a and 77b between the oil groove portions 75a and 75b.

Therefore, in the lubricating oil supplying structure for the crankshaft according to the present embodiment, when the radial direction supplying passage portion 71 is positioned to face the pair of opposing oil groove portions 75a and 75b in accordance with the rotation of the crank journal 73, both or at least one of end portions 80a and 80b of the radial direction supplying passage portion 71 are or is always opened to the oil groove portions 75a and 75b. Even if the radial direction supplying passage portion 71 is positioned to face the crank journal bearing surface portion 77a, 77b between the one oil groove portion 75a and the other oil groove portion 75b, both or at least one of the end portions 80a and 80b are or is opened to the oil groove portions 75a and 75b.

As a result, since at least either one of the end portions 80a and 80b of the radial direction supplying passage portion 71 is opened to the oil groove portions 75a and 75b regardless of the rotational angle of the crank journal 73, the lubricating oil flows into the radial direction supplying passage portion 71 from the oil groove portions 75a and 75b, and, therefore, the lubricating oil is constantly supplied through the axial direction supplying passage portion 72 to the connecting rod bearing.

As compared with a case in which a hole portion is formed as a preparation hole to penetrate through the hole portion 79, i.e. the hollow hole, in the crank journal radial direction, and a pipe is pressure-inserted and fixed to the preparation hole to be opened to the oil groove portion so that a supply passage in the crank journal radial direction constructing a lubricating oil supplying passage is formed, or a case in which a tube is pressure-inserted along the axial direction into the hole portion 79, i.e. the hollow hole, and a lubricating oil supplying passage opened to the supply oil portion 83 to which the lubricating oil is supplied from the oil pump is formed between the outer circumferential surface of the tube and the inner circumferential surface of the hole portion 79, the lubricating oil supplying structure in the crank journal bearing according to the present embodiment is advantageous in that it is unnecessary to form the hole portion as the preparation hole penetrating through the hollow hole of the crank journal 73 since the radial direction supplying passage portion 71 is disposed to keep clear from the hole portion 79.

As a result, there is no case that the inside of the preparation hole is partially damaged when the pipe is pressure-inserted into the preparation hole. Accordingly, it is possible to eliminate a possibility that the crank journal 73 is lowered in strength.

Since it is possible to dispense with a process of preliminarily forming the preparation hole penetrating through the hollow hole of the crank journal and pressure-inserting the pipe into the preparation hole, and a process of pressure-inserting the tube into the hollow hole, it is possible to reduce the number of manufacturing processes when the lubricating oil supplying passage of the crankshaft 19 is formed. Consequently, it is possible to lower the manufacturing cost when the lubricating oil supplying passage is formed.

In addition, although the present embodiment has been described with reference to an example in which the hole portion 79 is formed at the central portion of the crank journal 73 in the axial direction so that the crank journal 73 has the hollow hole, the present invention is not limited to the present embodiment and the present invention can be applied to the crank journal which does not have such a hole portion.

The lubricating oil supplying structure for the crankshaft according to the present invention can be applied not only to the automotive engine but also to any kind of engine as long as the engine is of a reciprocating engine.

According to the first aspect of the present invention, since a pair of oil groove portions is provided in an inner circumferential surface portion of the crank journal bearing to extend across a connecting surface of a construction member supporting the crank journal along a movement direction of a piston and to be opposite to each other, and the lubricating oil supplying passage is provided between the crank journal and the crank pin, one end portion of which is opened to the groove portions provided in the crank journal bearing, the other end portion of which is opened to the inner circumferential surface portion of the connecting rod bearing, and which supplies the lubricating oil to the connecting rod bearing, the lubricating oil can be supplied to the connecting rod bearing for lubricating the connecting portion between the crank pin and the connecting rod.

Further, according to the first aspect of the present invention, since the pair of the oil groove portions is provided in the inner circumferential surface portion of the crank journal bearing to be formed along the movement direction of the piston and to be opposite to each other, no oil groove portion is formed in a portion of the crank journal bearing where the combustion load directly acts. As a result, a pressure receiving area for the combustion load can be secured in that portion, and therefore the combustion load of the engine can be sufficiently held by the bearing, and a predetermined pressure-resistive load against the crank journal bearing can be secured.

According to the second aspect of the present invention, since the oil groove portion is provided in the rod side inner circumferential surface portion of the connecting rod bearing, and the lubricating oil supplying passage is provided between the oil groove portion of the crank journal bearing and the oil groove portion of the connecting rod bearing, in addition to the effects of the first aspect of the present invention, the lubricating oil of the crank journal bearing is supplied to the connecting rod bearing, and the lubricating oil within the oil groove portion of the connecting rod bearing flows to the sliding contact surface between the connecting rod bearing and the crank pin, so that more lubricating oil is supplied between the crank pin and the connecting rod bearing to provide an excellent lubrication.

According to the third aspect of the present invention, since the lubricating oil supplying passage is formed as the single supply passage, in addition to the effects of the first and second aspects of the present invention, it is possible to eliminate a case where a supply passage corner portion is formed in a connecting part of the supply passages in the crankshaft when a plurality of supply passages are formed, and the stress concentration is caused at the corner portion. Consequently, it is possible to secure the strength of the crankshaft.

According to the fourth aspect of the present invention, in addition to the effects of the third aspect of the present invention, since the lubricating oil is constantly supplied from the oil groove portion of the crank journal bearing through the lubricating oil supplying passage, the lubricating oil can be well supplied to the connecting rod bearing.

According to the fifth aspect of the present invention, in addition to the effects of the second aspect, even if the oil groove portion is provided in the connecting rod bearing, the pressure-resistive load of a predetermined magnitude to the connecting rod bearing can be secured.

According to the sixth aspect of the present invention, in addition to the effects of the first aspect of the present invention, even if the oil passage is formed as the single, continuous supply passage, the lubricating oil can be well supplied to the portion of the connecting rod bearing corresponding to the rod lower end portion where the largest combustion load is received in the connecting rod. Further, since the oil groove portion is not provided in the portion of the connecting rod bearing corresponding to the rod lower end portion, the pressure receiving area is not reduced, and therefore even if the large combustion load acts, the load can be surely received. Accordingly, the large pressure-resistive load can be secured.

According to the seventh and eighth aspects of the present invention, similarly to the first aspect o the present invention, since the lubricating oil supplying passage is provided between the crank journal and the crank pin, one end portion of which is opened to the oil groove portions provided in the crank journal bearing, the other end portion of which is opened to the inner circumferential surface portion of the connecting rod bearing, and which supplies the lubricating oil to the connecting rod bearing, the lubricating oil can be supplied to the connecting rod bearing for lubricating the connecting portion between the crank pin and the connecting rod.

Further, according to the seventh and eighth aspects of the present invention, since the pair of the oil groove portions is provided in the inner circumferential surface portion of the crank journal bearing to be formed along the movement direction of the piston and to be opposite to each other, no oil groove portion is formed in a portion of the crank journal bearing where the combustion load directly acts. As a result, a pressure receiving area for the combustion load can be secured in that portion, and therefore the combustion load of the engine can be sufficiently held by the bearing, and a predetermined pressure-resistive load against the crank journal bearing can be secured.

According to the ninth aspect of the present invention, in addition to the effects of the seventh or eighth aspect, since the radial direction supplying passage portion forming a part of the lubricating oil supplying passage is disposed to keep clear from the hole portion provided in the axial center portion along the axial direction of the crank journal, it is unnecessary, unlike conventional cases, to form a hole portion as a preparation hole penetrating through the hollow hole of the crank journal, and consequently, it is possible to avoid a case where the interior of the preparation hole is partially damaged when the pip is pressure-inserted into the preparation hole. Therefore, it is possible to eliminate a possibility that the strength of the crank journal may be lowered.

Further, since it is possible to dispense with a process of preliminarily forming the preparation hole penetrating through the hollow hole of the crank journal and pressure-inserting the pipe into the preparation hole, and a process of pressure-inserting the tube into the hollow hole, it is possible to reduce the number of manufacturing processes when the lubricating oil supplying passage of the crankshaft 19 is formed. Consequently, it is possible to lower the manufacturing cost when the lubricating oil supplying passage is formed.

What is claimed is:

1. A lubricating oil supplying structure for a crankshaft, which is provided within the crankshaft disposed within a cylinder block of an engine and which supplies lubricating oil from a crank journal bearing supporting a crank journal to a connecting rod bearing provided in a crank pin, wherein a pair of oil groove portions is provided in an inner circumferential surface portion of the crank journal bearing, each of said pair of oil groove portions extending in a direction of piston movement and crossing mating surface construction members for support of the crank journal, and a lubricating oil supplying passage is provided between the crank journal and the crank pin, one end portion of which is opened to the oil groove portions provided in the crank journal bearing, the other end portion of which is opened to an inner circumferential surface portion of the connecting rod bearing, and which supplies the lubricating oil to the connecting rod bearing.

2. The lubricating oil supplying structure for the crankshaft as claimed in claim 1, wherein an oil groove portion is provided in an inner circumferential surface portion on an upper portion of the connecting rod bearing which supports a cylinder combustion load.

3. The lubricating oil supplying structure for the crankshaft as claimed in claim 2, wherein the pair of the oil groove portions is provided to be opposed to each other with a predetermined distance in a radial direction of the cylinder, and the lubricating oil supplying passage is formed as a single, continuous supply passage.

4. The lubricating oil supplying structure for the crankshaft as claimed in claim 3, wherein the lubricating oil supplying passage is so designed that when the one end portion is opened to a lower end portion of a first one of the pair of oil groove portions formed in the crank journal bearing, the other end portion is opened to the oil groove portion provided in the connecting rod bearing, and when the one end portion of the lubricating oil passage is opened to a lower end portion of a second one of the pair of oil groove portions in association with the rotation of the crankshaft, the other end portion of the lubricating oil supplying passage is opened to the oil groove portion provided in the inner circumferential surface portion of the connecting rod bearing.

5. The lubricating oil supplying structure for the crankshaft as claimed in claim 2, wherein the oil groove portion of the connecting rod bearing is provided to be spaced from a lower end portion of the rod of the connecting rod.

6. The lubricating oil supplying structure for the crankshaft as claimed in claim 1, wherein the lubricating oil supplying passage is so designed that the one end portion thereof is opened to the oil groove portions provided in the crank journal bearing, and the other end portion thereof is opened to a portion of the connecting rod bearing, which corresponds to a lower end portion of the rod of the connecting rod.

7. The lubricating oil supplying structure for the crankshaft as claimed in claim 1, wherein the lubricating oil supplying passage is constructed of a radial direction supplying passage portion that is provided along the radial direction of the crank journal and that is opened to the oil groove portions, and an axial direction supplying passage portion which is provided along the axial direction of the crank journal, one end portion of which is opened to the radial direction supplying passage portion and the other end portion of which is opened to an inner circumferential surface portion of the connecting rod bearing, and wherein the radial direction supplying passage portion is so designed that both end portions are opened to the crank journal surface portion, and in association with the rotation of the crank journal, either one of the end portions is opened to the oil groove portions.

8. The lubricating oil supplying structure for the crankshaft as claimed in claim 7, wherein the radial direction supplying passage is so designed that an angle of the and portions of the radial direction supplying passage portion with respect to the crank journal axial center is larger than an angle of the opposing end portions of the pair of the oil groove portions with respect to the crank journal axial center, but smaller than an angle of the end portions of the one oil groove portion with respect to the crank journal axial center.

9. The lubricating oil supplying structure for the crankshaft as claimed in claim 7, wherein a hole portion is formed in the crank journal in the axial direction center portion, extending along the axial direction, and the radial direction supplying passage portion is disposed so as to keep clear from the hole portion.

10. A lubricating oil supplying structure for a crankshaft, the lubricating oil supplying is provided within the crankshaft, which is disposed within a cylinder block of an engine, the lubricating oil supplying structure supplies lubricating oil from a crank journal bearing supporting a crank journal to a connecting rod bearing provided in a crank pin, the lubricating oil supplying structure comprising:

a pair of oil groove portions provided in an inner circumferential surface portion of the crank journal bearing, the pair of oil groove portions located on opposite sides of the inner circumferential surface portion relative to a line that passes through a center point of the crank journal bearing, the line extending in a direction that is parallel to a movement direction of a piston of the engine, and a lubricating oil supplying passage provided between the crank journal and the crank pin, a first end portion of the lubricating oil supplying passage is opened to the oil groove portions provided in the crank journal bearing, and a second end portion of the lubricating oil supplying passage is opened to an inner circumferential surface portion of the connecting rod bearing, the lubricating oil supplying passage supplies the lubricating oil to the connecting rod bearing.

* * * * *